ELECTRONIC INFORMATION STORING DEVICES

Filed Feb. 14, 1951 3 Sheets-Sheet 1

INVENTOR:
FREDERIC CALLAND WILLIAMS
ATTORNEYS:
Moore and Hall

INVENTOR:
FREDERIC CALLAND WILLIAMS
ATTORNEYS:
Moore and Hall

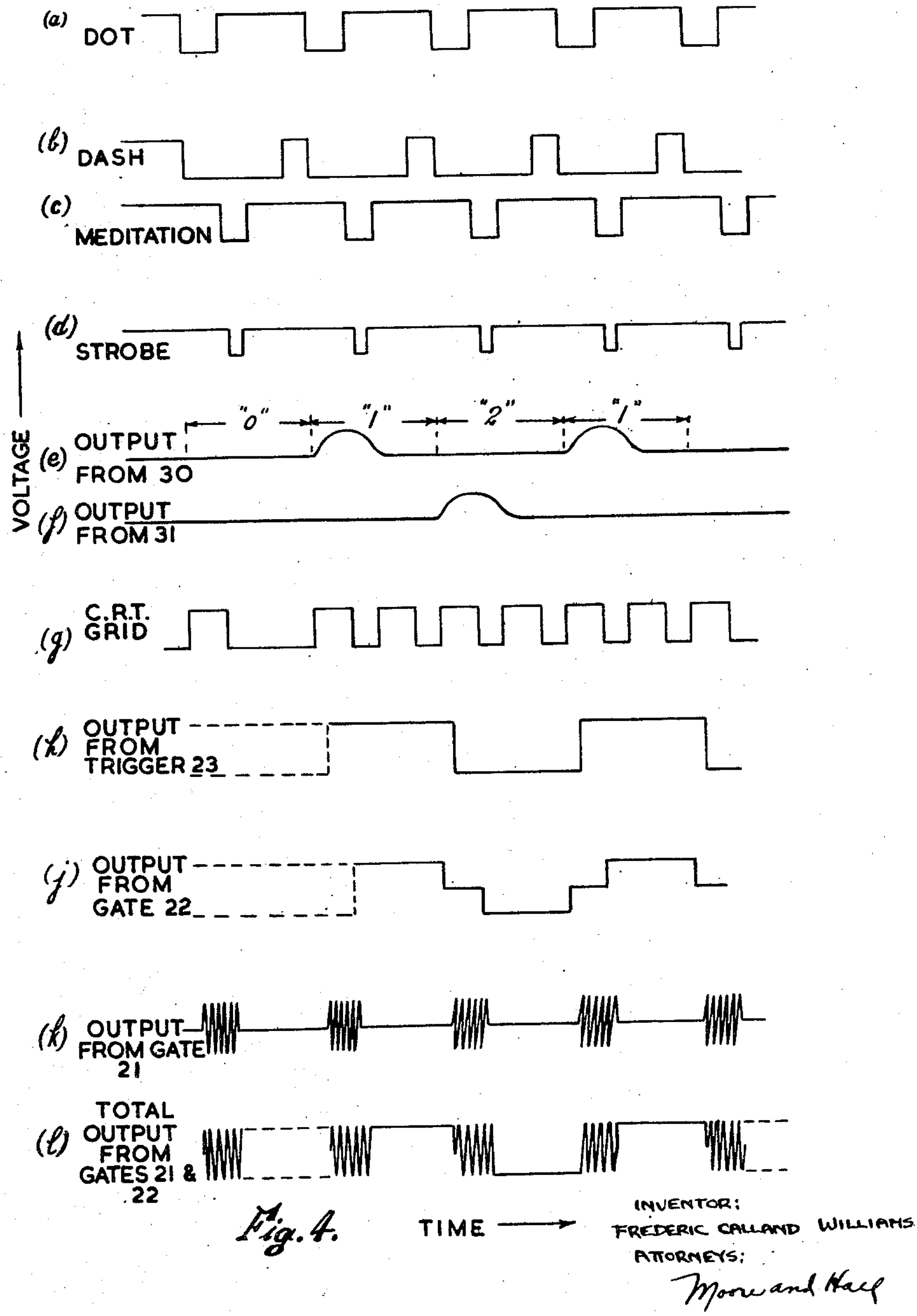
Fig. 4. TIME →
INVENTOR:
FREDERIC CALLAND WILLIAMS
ATTORNEYS:
Moore and Hall United States Patent Office 2,811,666

Patented Oct. 29, 1957

2,811,666

ELECTRONIC INFORMATION STORING DEVICES

Frederic Calland Williams, Timperley, England, assignor to National Research Development Corporation, London, England Application February 14, 1951, Serial No. 210,859

Claims priority, application Great Britain February 16, 1950

7 Claims. (Cl. 315—12)

This invention relates to a method of and means for storing digital information using electronic information-storing devices of the kind in which information is stored in the form of different conditions of charge produced upon an electric charge-retaining storage surface in a cathode ray tube by the electron beam of the tube.

It has been previously proposed (for example in U. S. patent specification Serial No. 124,192, filed October 28, 1949, by Frederic C. Williams and Tom Kilburn) to record binary digital information by charging a discrete area on the storage surface positively by the liberation of secondary electrons and reducing this positive charge, when appropriate, by liberating more secondary electrons in the neighbourhood of the said area.

The present invention employs a similar method of recording information but re-irradiates one or more spots in different positions to record information involving more than two digits.

According to the present invention there is provided a method of recording digital information in a storage device of the kind defined and comprising the steps of scanning the said storage surface in a predetermined path by an electron beam to set up a positive charge thereon and re-irradiating one or more of a plurality of parts of said path to modify the said positive charge, the part or parts re-irradiated being chosen in accordance with the digit to be recorded. According to a feature of the invention the initial scanning of the said path is a cyclic process so that on a subsequent exploration of the path a varying signal will be set up in a signal electrode near the storage surface and the phase and/or frequency of this signal will depend on the position and/or number of the parts in said path which were previously re-irradiated.

The invention will be described with reference to the accompanying drawings in which.

Figure 5:
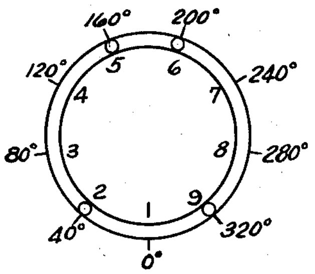
Figure 6:
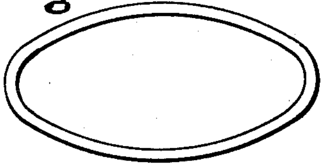
Figure 3:
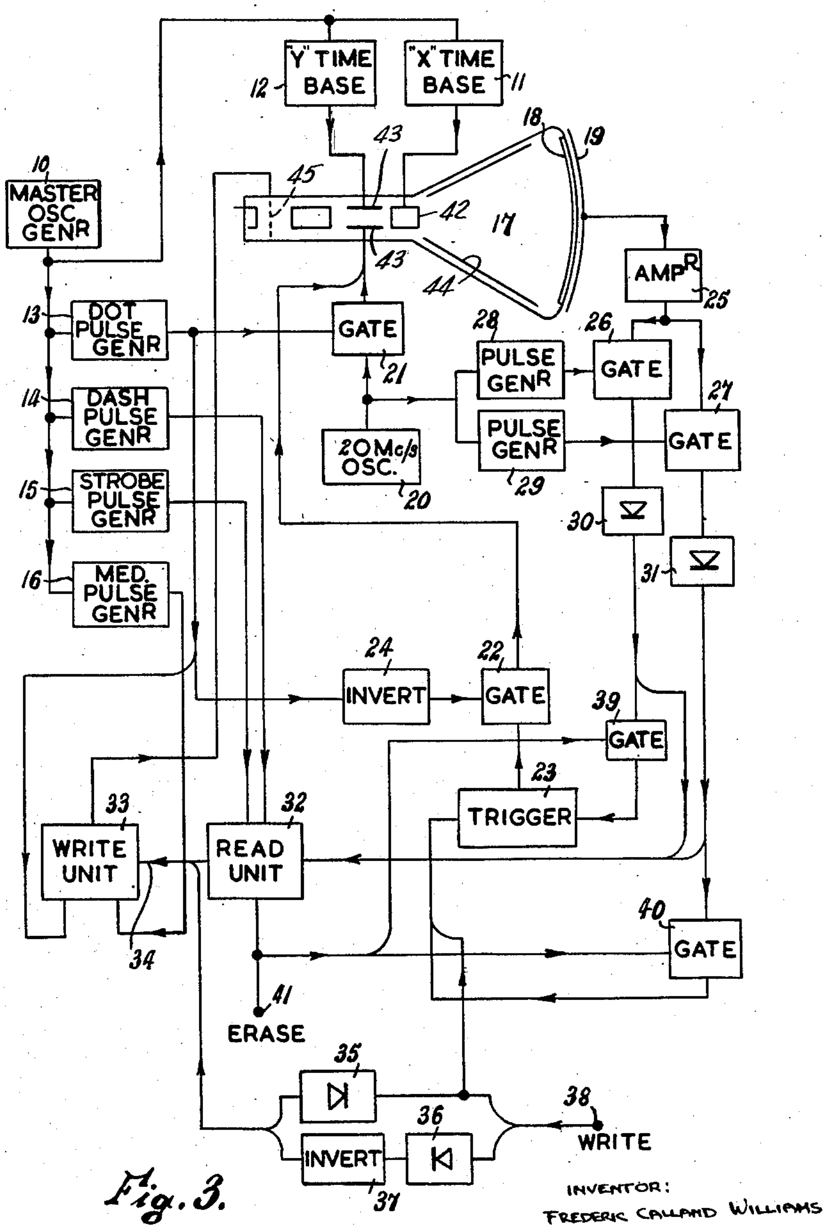
Figure 3 illustrates one embodiment of the invention.

Figure 4 contains waveforms appearing at various points of the circuit in Figure 3, and Figures 5 and 6 show alternative patterns of scanning that may be employed.

Figure 1:
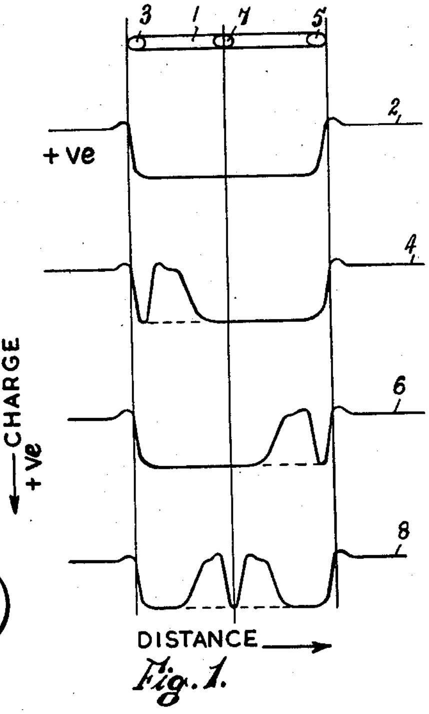
Figures 1 and 2 are diagrams illustrating the principles of the invention.
Figure 2:
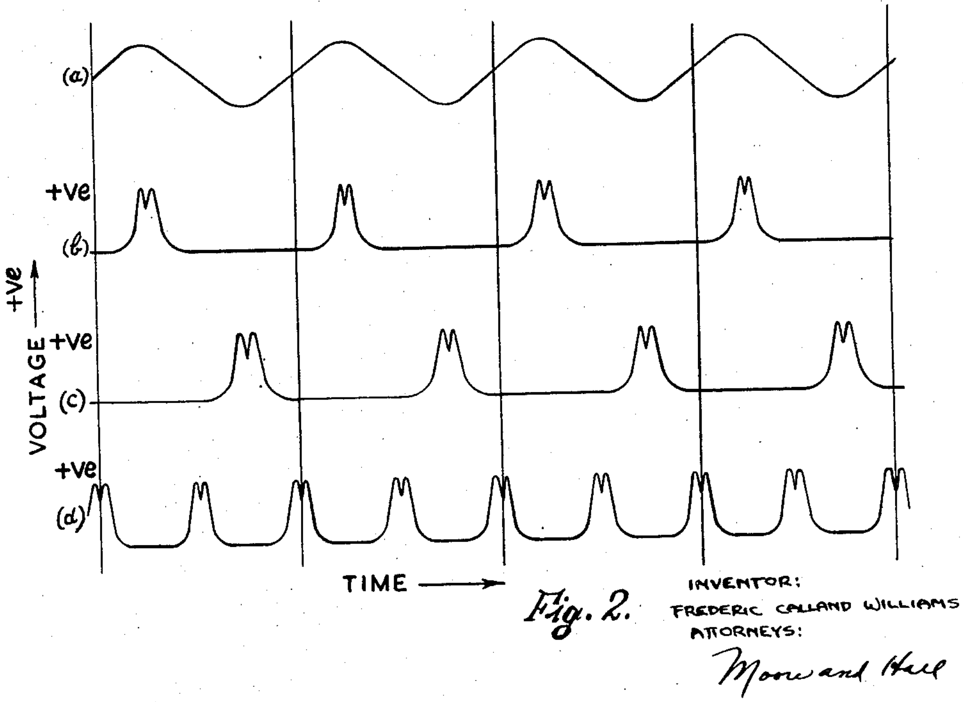

Referring to Figure 1, a line 1 on the storage surface of a cathode ray storage tube is assumed to be scanned cyclically by applying an oscillatory potential of high frequency (say 20 mc./s.) to deflecting plates in the tube. The waveform of this scanning potential is shown in Figure 2(*a*). The electron velocity of the scanning beam is so chosen that the secondary to primary electron ratio is greater than unity and consequently a positive charge, indicated in the graph 2, is set up along the scanned line. In graphs 2, 4, 6, and 8 in Figure 1, positive charge is measured downward. One digit of information may be recorded by leaving this charge unchanged. This digit will be subsequently detected by a negative transient or, more usually, by the absence of a positive transient, generated on a signal plate coupled capacitively to the storage surface when the line is scanned again. If a different digit of information is to be recorded, a spot 3 at one end of the line 1 may be irradiated for such a time that the secondary electrons liberated "fill up" or neutralise the positive charge previously set up near the spot 3. The resultant charge is indicated by the graph 4 in which the previous positive charge is shown by a dotted line. When this modified line is scanned again there will be set up in the signal plate a series of positive pulses occurring at the peaks, in this case assumed to be the positive peaks, of the oscillation of Figure 2(*a*), as the positive charge is being re-established near the spot 3. These pulses are indicated at (*b*) in Figure 2.

A further digit of information may be set up by irradiating not the spot 3 but a spot 5 at the other end of the line. The resultant charge is then as indicated at 6 in Figure 1, again the previous positive charge is indicated by a dotted line. When this charge is scanned again positive pulses will also be obtained at the signal electrode of the tube but this time at the negative peaks of the oscillation of Figure 2(*a*). These pulses are indicated at (*c*) in Figure 2.

If necessary yet another digit of information may be set up by irradiating a spot 7 at the centre of the line 1, to yield a charge as indicated at 8. The resultant signal on re-exploration will be as indicated at (*d*) in Figure 2 and it will be noticed that in this case the positive pulses occur each time the scanning potential of Figure 2(*a*) crosses the zero line, that is to say at twice the frequency of the pulses at (*b*) or (*c*). This doubling of the pulse frequency occurs for all positions of the irradiated spot intermediate the two end positions because for such positions the spot is traversed once in each direction in each cycle of the scanning oscillation. It should be noted that the pulses shown at (*b*), (*c*) and (*d*) in Figure 2 will in fact be of progressively decreasing amplitude owing to the progressive restoration of the positive charge at and near the spot or spots previously re-irradiated. The decrease in amplitude will, however, usually be too small to be shown clearly in four periods of the high frequency potential of Figure 2(*a*).

The speed of scanning must be chosen in conjunction with the intensity of the electron beam in such a manner that the positive charge is built up progressively during the scanning process and when the positive charge has to be modified the time that the beam is switched on must be chosen to produce the required modification. These factors will depend on the particular cathode ray tube used and the conditions of operation but may readily be found by trial.

The question of scanning speeds is discussed at length in a paper entitled "A storage system for use with binary-digital computing machines" in the Proceedings of the Institution of Electrical Engineers, part III, No. 40, March 1949, pp. 81–100.

There are many other possible procedures that may be carried out in apparatus according to the invention. For example, instead of scanning a simple line the electron beam may explore a loop, such as a circle or ellipse as shown for example in Figures 5 and 6 respectively, and different digits of information may be recorded by irradiating spots at different positions on the loop. Thus, as shown in Figure 5, ten-digit (decimal) information may be recorded by scanning a circle leaving the positive charge unchanged for the digit 0 and modifying the charge by re-irradiating spots at 0°, 40°, 80°, 120°, 160°, 200°, 240°, 280° and 320°, to represent the digits 1, 2, 3, 4, 5, 6, 7, 8 and 9 respectively. All these recorded digits will give pulses with different phases relative to the scanning potentials and may be detected by a suitable phase-sensitive device. In Figure 5 the digits 2, 5, 6 and 9 are shown recorded by spots irradiated at 40°, 160°, 200° and 320° respectively.

In other cases different digits may be recorded by re-irradiating different numbers of spots in a scanned loop. Thus three digit information may be recorded by scanning a circle and leaving it unchanged for the digit 0, re-irradiating the top of the circle to record the digit 1 and re-irradiating the top and bottom of the circle to record the digit 2.

Many methods for detecting the stored charges for the purpose of regenerating, reading or changing them, will readily occur to those skilled in these matters.

The embodiment shown diagrammatically in Figure 3 is a three-state storage system in which a straight line is scanned on the storage surface, is left unchanged to represent the digit 0, is re-irradiated at one end to represent the digit 1 and at the other end to represent the digit 2.

In Figure 3, a master oscillator 10 serves to generate oscillations of a frequency equal to the digit interval frequency and of suitable waveform to provide the necessary synchronising control for "X" and "Y" time base generators 11 and 12 and a number of pulse generators 13, 14, 15 and 16. The "Y" time base generator 12 may be as described in the specification of U. S. application Serial No. 93,612, filed May 16, 1949 and may be of other suitable kind. The "X" time base generator 11 may generate in known manner a stepped waveform by which the beam is deflected in steps separated by intervals, referred to as digit intervals, during which it is stationary.

The time base waveforms from 11 and 12 are applied to deflecting plates 42 and 43 of a cathode ray storage tube 17 having a screen 18 which may be the normal phosphor screen or a separate screen and the surface of which constitutes the electric charge-retaining storage surface. A signal plate 19 is capacitively coupled to the screen 18. Secondary electrons liberated from the storage surface are collected by a suitable collector such as a final anode 44.

The waveforms generated by the pulse generators 13 to 16 are as shown in Figures 4(*a*) to (*d*) respectively, 13 being a dot pulse generator, 14 a dash pulse generator, 15 a strobe pulse generator and 16 a "meditation" pulse generator. The last named generator may be dispensed with but it is preferred to use it for the purpose described in the specification of U. S. patent application Serial No. 165,262, filed May 31, 1950, by Frederic C. Williams and Tom Kilburn. All these four waveforms are shown with the pulses negative-going.

There is provided a generator 20 adapted to generate a sinusoidal deflecting voltage at a frequency of say 20 mc./s. This deflecting oscillation is applied to a deflecting plate of the tube 17 (in this example assumed to be a "Y" plate 43) under the control of a gate 21 which is opened by the dot pulses from the generator 13 and is closed during the intervals between dot pulses. The gate 21 is arranged, when open, to pass both positive and negative half cycles of the 20 mc./s. oscillation and is perhaps better described as a keying modulator. The bursts of the 20 mc./s. oscillation passed by the gate 21 are of the form shown at (*k*) in Figure 4. They serve to deflect the beam along the line 1 in Figure 1 during part of the time when a constant potential is applied to the deflecting plates by the generators 11 and 12.

There is also applied to the "Y" deflecting plates 43 through a gate 22 the output potential from a trigger circuit 23 which has two stable conditions in one of which it produces a positive and in the other of which it produces a negative potential, these potentials being sufficient to deflect the beam to the two extremities respectively of the line scanned by the 20 mc./s. oscillation. The trigger circuit 23 thus constitutes two sources each of a different fixed voltage. It is pointed out that the junction between the outputs from gates 21 and 22 is shown curved. This is intended to indicate, here and elsewhere in Figure 3, that a buffer stage should be included unless the circuits connected to such a junction are so constituted as to render such a buffer unnecessary.

The gate 22 is controlled by the dot pulses from 13. An inverter 24 is shown in the connection between 13 and 22 to indicate that the sense of the control of the gate 22 must be opposite to that of the gate 21: that is to say when one is open the other is closed. If the gates 21 and 22 are of the same kind, the result may be achieved by inverting the sense of the pulses applied to one of the gates. However, if the gates are suitably different it will be unnecessary to provide an inverter.

It has already been explained with reference to Figures 1 and 2 that the output from the signal plate 19 of the tube 17, and hence from an amplifier 25 coupled to the signal plate, when the scanned line is explored during a dot period will depend upon the previous sequence of charging of the scanned line. Thus if the digit "0" was previously stored the amplifier output signal, neglecting cloud pulse signals, will be zero whereas when the digit "1" or "2" has been stored the output will be of one of the two kinds shown in Figures 2(*b*) and (*c*). These output signals corresponding to the digits "1" and "2" comprise positive pulses generated at the times of occurrence of in one case the positive and in the other case the negative peak of the 20 mc./s. scanning oscillation, and these pulses may be distinguished by an observation of their phase with respect to the 20 mc./s. time base oscillation. The amplifier output signal is therefore fed in parallel to gate circuits 26 and 27 which are arranged to be opened respectively by gating pulses generated at about the times of occurrence of the positive and negative peaks of the 20 mc./s. oscillation by gating pulse generators 28 and 29 respectively. Thus if for example the digit "1" had previously been recorded, during a subsequent dot period gate 26 (say) is open and gate 27 is closed during the occurrence of a positive pulse on the signal plate 19 and hence a positive signal is obtained at the output of gate 26, while if the digit "2" had been previously recorded the positive signal would be obtained at the output of gate 27. The gated signals from 26 and 27 are fed to rectifier devices 30 and 31 to produce positive signal pulses which may be used to regenerate the state of charge on the scanned line in a manner now to be described.

Associated with the control grid 45 of the tube 17 and completing the regenerative loop between this grid and the signal plate 19 and including the amplifier 25 is a so-called gate circuit comprising a reading unit 32 and a writing unit 33. These two units together may be constituted in the manner described in the specification of U. S. patent application Serial No. 119,306 filed October 3, 1949, now Patent No. 2,671,607, issued March 9, 1954, or No. 124,192 filed October 28, 1949. Dot and dash pulse waveforms as shown at (*a*) and (*b*) respectively in Figure 4, a meditation pulse waveform as shown at (*c*) and a strobe pulse waveform as shown at (*d*) in Figure 4 are fed to the reading and writing units from generators 13, 14, 15 and 16. The writing unit 33 operates under the control of the reading unit 32 normally to apply dot pulses to the control grid of the tube 17, but when a positive pulse is applied from the gate 26 or 27 and rectifier device 30 or 31 to the reading unit 32, this pulse is sampled by a strobe pulse and the resulting short pulse is applied to the writing unit 33 to cause this unit to extend the time during which the beam is switched on, after the end of the meditation pulse, to the end of the corresponding dash. The strobe pulse is conveniently timed to occur, as shown in Figure 4 at (*c*) and (*d*), within the meditation pulse interval, provided that the time constants of the rectifiers 30 and 31 are adequately long. If, for example, regeneration of the digits "0," "1," "2" and "1" in succession is considered, the output voltages derived from the rectifiers 30 and 31 will be as indicated in Figures 4 (e) and (f) while the waveform fed from the writing unit 33 to the grid of the cathode ray tube 17 to switch the beam on and off will be as indicated in Figure 4 (g). It will be seen from Figure 4 (g) that in the first digit interval indicated by "0" the beam is switched on only for the dot interval while in the digit intervals marked "1," "2" and "1" the beam is switched on again after the meditation pulse interval until the end of the corresponding dash interval. In other words the "bright-up" interval is extended.

In order to differentiate between the digits "1" and "2" however, the appropriate steady deflecting potentials must be applied to the "Y" deflecting plates during the intervals when the beam is switched on. The two positive output signals from rectifier devices 30 and 31 are, therefore, fed respectively to the two inputs of the trigger circuit 23 and it is thus ensured that the trigger circuit 23 is set into the appropriate state before the extended bright-up interval commences. The output wave from the trigger circuit 23 is as shown in Figure 4 (h) and that from gate 22 by Figure 4 (j). It will be apparent that during the regeneration or writing of the digit "0" the state of the trigger circuit 23 is immaterial as its output potential, although fed to the "Y" deflecting plates, is ineffective because the cathode ray beam is blacked out. In the part of the first digit interval (representing "0") following the dot interval, therefore, the waveforms at (h), (j) and (l) in Figure 4 are shown dotted: the circuit may be arranged to provide any level at this time.

Figure 4 (l) shows the actual form of the potential applied to the "Y" plates by the gates 21 and 22. It will be apparent that the gate 22 must be capable of transmitting variations of input signals in both directions about the zero of datum level provided by the output circuit to which the gate is connected. Thus during the dot periods when gate 22 is closed and therefore not effective to transmit a steady potential, the steady potential of the "Y" plates about which the 20 mc./s. oscillation is applied, must lie mid-way between the limits of variation produced by the output voltage of the trigger circuit 23.

The system as described is capable of regenerating data already stored. In order to write any new data into the store it is necessary to apply a signal to the writing input 34 of the writing unit 33 which simulates a dash pulse and also to apply an appropriate pulse to condition suitably the trigger circuit 23. The normal mode of representation of three digits "0," "1" and "2" in dynamic form in the external circuits may be assumed to be zero or a given datum voltage for the digit "0" and positive and negative pulses respectively of dash length for the digits "1" and "2." The digit pulse of dash length required to be fed to the writing input 34 may be assumed to be negative-going and thus, with the above assumption regarding the polarity of representation, pulses representative of the digit "2" may be fed directly to the writing input 34. The positive-going dash pulses representative of "1" digits must however be reversed in polarity before they can be applied to the writing input 34. Circuits 35, 36 and 37 are therefore provided between the terminal 38 to which writing signals are applied and the write input 34. Circuit 35 comprises a rectifier or some other suitable non-linear circuit which is effective to pass negative-going signals ("2" digits) only while circuit 36 is of a similar form but arranged to pass positive-going ("1" digits) only and is followed by the polarity reversing circuit or inverter 37. Thus pulses representative of both digits "1" and "2" applied at terminal 38 will be applied to the write input connection 34 as negative-going pulses of dash length. In order to ensure that the trigger circuit 23 is set into the correct state when writing is effected by means of signals applied to terminal 38, it is necessary to provide gate circuits 39 and 40 in the connections to the inputs of the trigger circuit 23. These gate circuits normally transmit the triggering signals from the rectifiers 30 and 31 respectively to the trigger circuit but are conditioned by a suitable voltage applied to an "erase" terminal 41 to inhibit the passage of such signals when external writing is in progress. The external write signal is fed directly to one input of the trigger circuit 23, this circuit being capable of being triggerd in the appropriate one of the two senses by signals of the corresponding polarity applied to one input thereof. It may be a well-known form of multi-vibrator for example. During external writing it is also necessary to interrupt the regenerative loop, for example in the manner described in U. S. patent specification Serial No. 119,306 filed October 3, 1949, now Patent No. 2,671,607, issued March 9, 1954, or Serial No. 124,192 filed October 28, 1949 by applying a suitable erasing waveform to cut off the first valve in the reading unit 32. This erasing waveform is conveniently a negative-going potential wave which is applied to cut off the first valve on its suppressor grid. This erasing waveform is assumed to be that applied to terminal 41 to condition the gates 39 and 40. The erasing waveform will of course be provided by the external equipment, such as a computor, in connection with which the storage system described is operating.

It is not essential that the spots re-irradiated should lie exactly in the path along which the beam is scanned by the 20 mc./s. oscillation so long as the spots irradiated are sufficiently close to the path for secondary emission from the spots to pass to the path and reduce the positive charge thereon.

When the path along which the beam is scanned is a circle or an ellipse, instead of applying the high frequency oscillations only to the Y-deflecting plates they are applied in quadrature and at suitable relative amplitude to the X and Y-deflecting plates. In a simple example in order that there may be four spots that can, when required by the nature of the information to be stored, be irradiated, means may be provided for applying either of two different fixed voltages to either the X or the Y-deflecting plates. When the number of spots to be irradiated exceeds four, means are provided for applying suitable voltages simultaneously to the X and Y-deflecting plates.

I claim:

1. A method of storing digital information employing a cathode ray tube having a storage surface, comprising the steps of scanning the cathode ray beam along a predetermined path on said surface to set up a positive charge on said path, irradiating a first localized region of said surface to liberate secondary emission to a first localized part of said path to reduce the positive charge on said part and thereby to represent one item of information, and irradiating a second localized region of said surface to liberate secondary emission to a second localized part of said path to reduce the positive charge on the second part and thereby to represent a further item of information.

2. A method of storing digital information employing a cathode ray tube having an electric charge-retaining storage surface and a signal plate capacitively coupled to the storage surface, comprising scanning the cathode ray beam along a predetermined path on said surface to set up a positive charge on said path, irradiating a first region of said surface to liberate secondary emission to a first localized part of said path to reduce the positive charge on said part and thereby to represent one item of information, irradiating a second region of said surface to liberate secondary emission to a second localized part of said path to reduce the positive charge on the second part and thereby to represent a further item of information, again scanning the beam along said path to generate a signal in said signal plate corresponding to the position of each of said parts and applying said signals to control the instants of further irradiations of said regions in order to regenerate the charges on said parts.

3. Apparatus for storing digital information comprising a cathode ray tube having a storage surface, means to direct a beam of electrons upon said surface, deflection means adjacent said beam, a source of oscillatory voltage, a plurality of sources each of different fixed voltage source, means coupling said oscillatory voltage and said fixed voltage sources, said coupling means including switch means coupling said oscillatory voltage source and said fixed voltage sources selectively to said deflection means, and said coupling means also comprising selector means for selecting the one of said fixed voltages applied to said deflection means in accordance with the information to be stored.

4. Apparatus for storing digital information comprising a cathode ray tube having a storage surface, a signal plate capacitively coupled to said storage surface, means to direct a beam of electrons upon said surface, deflection means adjacent said beam; a source of oscillatory voltage, a plurality of sources each of different fixed voltage, means coupling said oscillator voltage source and said fixed voltage sources, said coupling means including switch means coupling said oscillatory voltage source and said fixed voltage sources selectively to said deflection means, selector means associated with said fixed voltage sources, and means to apply signals from said signal plate to said selector means to select the fixed voltage applied to deflect the beam.

5. Apparatus according to claim 4 comprising a plurality of circuits, a gate device in each of said circuits, means to apply signals from said signal plate to said gate devices, and means to apply said oscillatory voltage to open said gate device for the passage therethrough of said signals at different points in each cycle of said oscillatory voltage, whereby signals appear in the said circuits respectively according to their phase in relation to the oscillatory voltage.

6. Apparatus for storing digital information comprising a cathode ray tube having an electric charge-retaining storage surface, means to direct a beam of electrons upon said surface, deflection means adjacent the path of said beam, a first source of oscillatory voltage, a second source of a plurality of substantially fixed voltages of different values, said second source having an output terminal, first control means coupling said first source and said output terminal selectively to said deflecting means and second control means coupled to said second source and responsive to information to be stored to selectively apply said substantially fixed voltages to said output terminal in dependence upon the said information.

7. Apparatus according to claim 6 comprising a signal plate capacitively coupled to said storage surface and means coupling said signal plate to said second control means to select the substantially fixed voltages applied to said deflecting means and thereby regenerate charges upon said storage surface.

References Cited in the file of this patent

UNITED STATES PATENTS

| | | |
|---|---|---|
| 2,093,157 | Nakashima | Sept. 14, 1937 |
| 2,155,192 | Johnson | Apr. 18, 1939 |
| 2,186,393 | Ring et al. | Jan. 9, 1940 |
| 2,237,093 | Tuxen | Apr. 1, 1941 |
| 2,455,532 | Sunstein | Dec. 7, 1948 |
| 2,461,667 | Sunstein | Feb. 15, 1949 |
| 2,474,628 | Hurvitz | June 28, 1949 |
| 2,510,121 | Lehmann | June 6, 1950 |
| 2,548,276 | Weisbecker | Apr. 10, 1951 |
| 2,589,460 | Tuller | Mar. 18, 1952 |

FOREIGN PATENTS

| | | |
|---|---|---|
| 403,060 | Great Britain | Mar. 7, 1932 |